Figure 1:
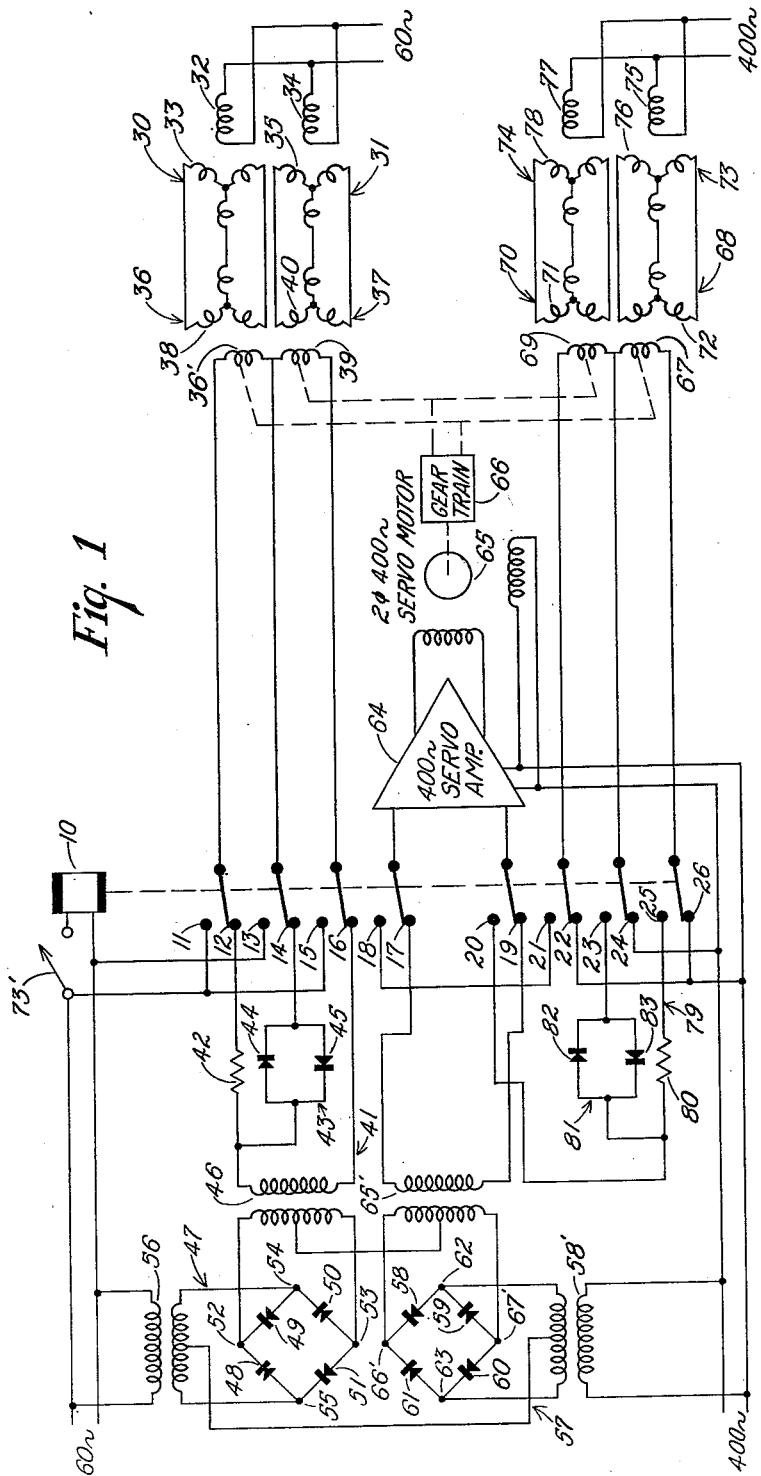

March 8, 1955 H. W. COURTNEY 2,703,879
BILATERAL SYNCHRO DATA CONVERTER
Filed Oct. 29, 1953

United States Patent Office 2,703,879
Patented Mar. 8, 1955

2,703,879

BILATERAL SYNCHRO DATA CONVERTER

Howard W. Courtney, Ann Arbor, Mich., assignor to Raytheon Manufacturing Company, Waltham, Mass., a corporation of Delaware Application October 29, 1953, Serial No. 389,049

7 Claims. (Cl. 340—347)

The present invention relates in general to a synchro data converter system, and more particularly to a bilateral synchro data converter system.

In repeater systems aboard ships, it has been found desirable at times to convert 60 cycle synchro data to 400 cycle synchro data, and at other times to convert 400 cycle synchro data to 60 cycle synchro data. Heretofore, separate and independent systems were utilized to perform the just described function. Accordingly, two servomotors, two gear trains and two servo amplifiers were required. In the event the 60 cycle servo amplifier utilized therein was a magnetic amplifier, long time delays or lags were produced.

Accordingly, an important object of the present invention is to provide a single closed loop servo converter system for at times converting synchro data at one frequency to synchro data at another frequency, and at other times converting synchro data at said other frequency to synchro data at said one frequency.

Another object of the present invention is to provide a bilateral synchro data converter system for at times converting 60 cycle synchro data to 400 cycle synchro data, and at other times converting 400 cycle synchro data to 60 cycle synchro data.

Other objects and features will appear upon further perusal of the detailed description taken in conjunction with the accompanying drawing in which:

Fig. 1 is a schematic diagram of the bilateral synchro data converter system embodied in the present invention.

Briefly described, a single closed loop synchro data converter system is herein provided for at times converting 60 cycle synchro data into 400 cycle synchro data, and at other times converting 400 cycle synchro data into 60 cycle synchro data.

For converting 60 cycle synchro data into 400 cycle synchro data, a switching relay remains deenergized. The 60 cycle synchro data is received from external synchros operating at 60 cycles. For detecting an error between a controlled signal and the controlling 60 cycle synchro data signal, conventional fine and coarse 60 cycle control transmitters are provided.

The error signal represents misalignment between controlled member or synchro shaft and controlling signal or electrical input to control transmitter.

For switching from coarse synchro error data to fine synchro error data, a conventional dual speed 60 cycle synchro switching circuit is provided, which receives the error voltages from the 60 cycle control transmitters. The dual speed 60 cycle switching circuit is a non-linear circuit having a voltage output which is a function of the amplitude of the error voltages from the individual 60 cycle control transmitters.

In order to demodulate the 60 cycle error data, a conventional 60 cycle keyed demodulator is provided. The keyed demodulator receives a 60 cycle reference phase voltage and is connected to the switching circuit. The 60 cycle reference phase voltage is fed to the keyed demodulator for demodulating the synchro error voltage. The output of the keyed demodulator is a voltage having the phase and amplitude of the error signal.

To provide a 400 cycle modulated error signal, a conventional 400 cycle keyed modulator is provided, receiving a 400 cycle reference voltage which is modulated by the output voltage from the 60 cycle keyed demodulator.

For controlling the rotation of a 2 phase 400 cycle servomotor for mechanically positioning the 400 and 60 cycle synchro shafts, a conventional 400 cycle servo amplifier is provided. The 400 cycle servomotor is mechanically coupled to the rotors of the 60 and 400 cycle control transmitters. Accordingly, the servomotor positions the rotors of the 60 and 400 cycle control transmitters with respect to the associated stators in response to the synchro error signal so that the output of the 60 cycle control transmitters goes to a null and the rotors of the 400 cycle control transmitters are positioned relative to the associated stators for transmitting the incoming synchro data. The 400 cycle control transmitters are energized by the 400 cycle reference phase voltage. Therefore, when the 60 cycle control transmitters are reduced to a steady state, the 400 cycle rotors are positioned relative to the associated stators to transmit the synchro data phase angle and amplitude. Accordingly, the output angle of the 400 cycle control transmitters now repeats the input angle of the 60 cycle control transmitters.

In order to convert 400 cycle synchro data to a 60 cycle synchro data, the switching relay is energized. A 400 cycle synchro data is received from external synchros. For detecting an error between a controlled signal and the controlling 400 cycle synchro data signal, fine and coarse 400 cycle control transmitters are provided.

For switching from coarse synchro error signals to fine synchro error signals, a conventional 400 cycle dual speed synchro switching circuit is provided, which receives the synchro error voltage from the 400 cycle control transmitters. The 400 cycle switching circuit is a non-linear circuit having a voltage output which is a function of the amplitude of the error voltage from the individual 400 cycle control transmitters.

For controlling the rotation of the two phase 400 cycle servomotor in response to the 400 cycle synchro data, the 400 cycle servo amplifier is provided. The 400 cycle servomotor is mechanically coupled to rotors of the 60 cycle and 400 cycle control transmitters. Accordingly, the servomotor positions the rotors of the 60 and 400 cycle control transmitters to translate the phase and amplitude of the 400 cycle synchro data, with respect to the associated stators, in response to the synchro data so that the output of the 400 cycle control transmitters go to a null and the rotors of the 60 cycle control transmitters are positioned relative to the associated stators for transmitting the amplitude and phase angle of the incoming 400 cycle synchro data. The 60 cycle controlled transmitters are energized by a 60 cycle phase reference voltage through the contacts of the switching relay. In the last converting operation, the modulating and demodulating circuits are not utilized.

Referring to Fig. 1 for a more detailed description, a single loop synchro data converter is herein provided for at times converting 60 cycle synchro data to 400 cycle synchro data, and at other times converting 400 cycle synchro data into 60 cycle synchro data.

For converting 60 cycle synchro data into 400 cycle synchro data, a conventional alternating current switching relay 10 remains deenergized.

For providing a controlling signal of 60 cycle synchro data, a conventional fine 60 cycle control transmitter 30 and a conventional coarse 60 cycle control transmitter 31 are provided. The relative position of a rotor 32 with respect to a stator 33 transmits the phase angle and amplitude of the 60 cycle fine synchro data for the control transmitter 30. Similarly, the relative position of a rotor 34 with respect to a stator 35 transmits the phase angle and amplitude of the 60 cycle coarse synchro data for the control transmitter 31.

For detecting and transmitting an error between the controlled signal and the controlling signal, a conventional fine 60 cycle control transmitter 36 and a coarse 60 cycle control transmitter 37 are provided. The control transmitters 30 and 31 are electrically connected to the control transmitters 36 and 37, respectively, to provide the controlling signal or synchro data. The controlled signal is provided by the relative positioning of a rotor 36' and a stator 38 of the control transmitter 36 and also the relative positioning of a rotor 39 relative to a stator 40 of the control transmitter 37. The voltage output of the transmitters 36 and 37 provides an error voltage, which represents misalignment between controlled members or synchro shafts, and controlling signal or synchro data.

In order to switch from the coarse synchro error signal to the fine synchro error signal, a conventional dual speed 60 cycle synchro switching circuit 41 is provided. The switching circuit 41 comprises a resistor 42 connected to one side of the fine rotor 36' of the control transmitter 36. A common path for rotors 36' and 39 is connected to a non-linear circuit 43, comprising rectifiers 44 and 45 connected back-to-back. One side of the rotor 39 of the control transmitter 37 is connected to the primary winding of a coupling transformer 46.

Rectifiers connected back-to-back provide a non-linear impedance. Accordingly, the effective impedance is a non-linear function of current flow and varies inversely therewith.

When the error voltage is large, the impedance across the rectifier network 43 decreases to permit the fine synchro data voltage to be developed across the resistor 42 and the coarse error voltage is developed directly across the primary winding of transformer 46. As the error voltage approaches a steady state or the shafts of the control transmitters 36 and 37 approach a null, the impedance across the rectifier network 43 increases to permit the fine synchro data voltage to be developed across the primary winding of transformer 46.

For demodulating the 60 cycle synchro error data, a conventional 60 cycle key demodulating circuit 47 is provided. The key demodulating circuit 47 comprises a rectifier bridge having rectifiers 48, 49, 50 and 51. The keyed demodulator 47 is coupled to the dual speed 60 cycle synchro switching circuit 41 through the transformer 46 at the terminals 52 and 53. The voltage induced in transformer 46 is a 60 cycle carrier modulated by the synchro error data. At opposite terminals 54 and 55 of the rectifier bridge, a 60 cycle reference phase voltage is produced through a coupling transformer 56. The 60 cycle reference voltage nullifies the 60 cycle carrier producing the synchron error data or error voltage.

For producing the 400 cycle synchro error data voltage, a conventional keyed modulator 57 is provided. The synchro error data voltage is injected into the 400 cycle modulator and modulates a 400 cycle reference phase voltage. The reference phase voltage is injected in the modulator 57 through a coupling transformer 58'. The modulating signal is injected into the modulator 57 at the center taps of transformers 58' and 65' from the center of transformers 56 and 46, respectively. The modulator 57 comprises a bridge rectifier, having rectifiers 58, 59, 60 and 61. The transformer 58 is connected to the modulator 57 at the terminals 62 and 63.

For amplifying the 400 cycle synchro error voltage, a conventional 400 cycle servo amplifier 64 is provided. The 400 cycle servo amplifier 64 is coupled to the 400 cycle modulator 57 through a coupling transformer 65', having the primary thereof connected to the terminals 66' and 67'.

For translating the 400 cycle error voltage into mechanical movement, a conventional 2 phase 400 cycle servomotor 65 is provided. The servomotor 65 is energized by the 400 cycle reference phase voltage and has the operation thereof controlled by the voltage output of the 400 cycle servo amplifier 64. Mechanically coupled to the servomotor 65 is a conventional gear train 66. One shaft from the gear train 66 is mechanically coupled to the fine rotor 36' of the 60 cycle control transmitter 36 and the fine rotor 67 of a conventional 400 cycle transmitter 68. Another shaft from the gear train 66 is mechanically coupled to the coarse rotor 39 of the 60 cycle control transmitter 37 and a coarse rotor 69 of a 400 cycle control transmitter 70.

For converting the 60 cycle synchro data into 400 cycle synchro data, the 400 cycle control transmitters 68 and 70 are provided, which are energized by the 400 cycle reference phase voltage through contacts 22, 24 and 26. The gear train 66 is responsive to the operation of the servomotor 65, which operation is relative to the phase and amplitude of the synchro error voltage. Accordingly, the shafts from the gear train 66 position the rotors 36', 39, 69 and 67 relative to its associated stators. Therefore, rotors 36' and 39 position relative to stators 38 and 40, so as to provide a null for the 60 cycle control transmitters 36 and 37. Further, the movement of the rotors 69 and 67 is controlled thereby so that the positioning of the rotor 69 with respect to a stator 71 provides a 400 cycle synchro data signal for the coarse control transmitter 70 and the positioning of the rotor 67 with respect to a stator 72 provides a 400 cycle synchro data signal for the fine control transmitter 68.

For converting a 400 cycle synchro data to 60 cycle synchro data, a suitable switch 73' is closed to energize a conventional alternating current relay 10 by the applied voltage from the 60 cycle reference phase line.

For providing a controlling signal of 400 cycle synchro data, a conventional fine 400 cycle control transmitter 73 and a conventional coarse 400 cycle control transmitter 74 are provided. The relative positioning of a rotor 75 with respect to a stator 76 transmits the phase angle and amplitude of the 400 cycle fine synchro data for control transmitter 75. Similarly, the relative position of a rotor 77 with respect to a stator 78 transmits the phase angle and amplitude of the 400 cycle coarse synchro data for the control transmitter 74.

The conventional 400 cycle control transmitters 70 and 72 are provided to detect and transmit the error angles between the incoming data or controlling signal and the output shafts or controlled signal. The control transmitters 70 and 72 are electrically connected to the control transmitters 74 and 73, respectively, to provide the controlling signal. The output of the transmitters 68 and 70 provides an error voltage, which represents misalignment between controlled members or synchro shafts, and controlling signal or synchro data.

In order to switch from the coarse synchro error voltage and provide a translation of the fine synchro error voltage near null, a conventional dual speed 400 cycle synchro switching circuit 79 is provided. In response to the energization of relay 10, contacts 18, 20, 21, 23 and 25 are closed to connect the control transmitters 68 and 70 and the 400 cycle servo amplifier 64 to the switching circuit 79. When the relay 10 was so energized, contacts 17 and 19 opened to disconnect the modulating circuit 57 from the 400 cycle servo amplifier 64. Contacts 12, 14 and 16 were opened to disconnect the 60 cycle switching circuit 41 from the 60 cycle control transmitters 36 and 37. Contacts 22, 24 and 26 opened to disconnect the control transmitters 68 and 70 from the 400 cycle reference phase voltage.

The switching circuit 79 comprises a resistor 80 connected to one side of the rotor 67 of the 400 cycle control transmitter 68 through the contacts 25. A common path for the rotors 67 and 69 of the control transmitters 68 and 70, respectively, is connected to a non-linear circuit 81. The closing of the contacts 23 connects the common path to the non-linear circuit 81, which comprises rectifiers 82 and 83, connected back-to-back. One side of the rotor 69 is connected to the 400 cycle servo amplifier 64 through the contacts 18 and 21.

The 400 cycle switching circuit 79 operates in a manner similar to the operation of the 60 cycle switching circuit 41. In circuit 81 are the rectifiers 82 and 83, that are combined to produce a non-linear impedance. For large errors, the fine synchro output voltage produced by control transmitter 68 is developed across resistor 80 and the coarse synchro output is fed directly to the amplifier 64. As the motor positions the output shaft or 400 cycle synchro shaft toward null, the fine 400 cycle synchro error voltage is again produced across the amplifier input impedance.

For amplifying the synchro error data voltage, the output of the switching circuit 79 is fed to the 400 cycle servo amplifier 64.

For translating the 400 cycle synchro error data or error voltage into mechanical movement, the 400 cycle servo amplifier 64 feeds the 2 phase 400 cycle motor 65 to control the movement thereof. The servomotor 65 is energized by the 400 cycle reference phase voltage. Mechanically coupled to the servomotor 65 is the conventional gear train 66. One shaft from the gear train 66 is mechanically coupled to the fine rotor 36' of the 60 cycle control transmitter 66, and the fine rotor 67 of the 400 cycle control transmitter 68. Another shaft from the gear train 66 is mechanically coupled to the coarse rotor 39 of the 60 cycle control transmitter 37 and the coarse rotor 69 of the 400 cycle control transmitter 70.

For mechanically converting the 400 cycle synchro data to 60 cycle synchro data, the gear train 66 in response to the operation of the servomotor 65, which operation is relative to the phase and amplitude of the synchro error data, positions the rotors 37, 39, 69 and 67 relative to its associated stators. Accordingly, the rotors 67 and 69 position relative to stators 71 and 72, respectively, to provide a null for the 400 cycle control transmitters 72 and 68, respectively. Further, the movement of the rotors 37 and 39 is controlled thereby so that the positioning of the rotor 39 with respect to the stator 40 provides a 60 cycle synchro data signal for the coarse transmitter 37, and the positioning of the rotor 37 with respect to the stator 38 provides a 60 cycle synchro data for the fine control transmitter 36. The 60 cycle control transmitters 36 and 37 are energized by the 60 cycle reference phase voltage through contacts 11, 13 and 15, which closed upon energization of the relay 10.

It is understood that modifications and variations may be effected without departing from the scope of the appended claims.

I claim:

1. In a synchro data converter system, an external control transmitter for transmitting a synchro data signal at one frequency, a first control transmitter for transmitting an error signal at said one frequency in response to said synchro data signal at said one frequency, a demodulating circuit for demodulating said error signal at said one frequency to provide a demodulated error signal, circuit means interconnecting said first control transmitter and said demodulating circuit, a modulating circuit connected to said demodulating circuit for modulating a signal thereof at another frequency by said demodulated error signal to provide a modulated error signal at said other frequency, a second control transmitter for transmitting a synchro data signal at said other frequency, and means including a motor controlling the operation of said second control transmitter for transmitting said synchro data signal at said other frequency.

2. In a synchro data converter system, external control transmitters for transmitting synchro data signals at one frequency, a pair of first control transmitters for transmitting an error signal at said one frequency in response to said synchro data signal at said one frequency, a demodulating circuit for demodulating said error signal at said one frequency to provide a demodulated error signal, circuit means interconnecting said first control transmitters and said demodulating circuit, a modulating circuit connected to said demodulating circuit for modulating a signal thereof at another frequency by said demodulated error signal to provide a modulated error signal at said other frequency, a second pair of control transmitters for transmitting synchro data signals at said other frequency, and means including a servomotor controlling the operation of said first control transmitters to provide a steady state condition and controlling the operation of said second transmitters for transmitting said synchro data signal at said other frequency.

3. In a synchro data converter system, external control transmitters for transmitting synchro data signals at one frequency, a first control transmitter transmitting an error signal at said one frequency in response to said synchro data signal at said one frequency, a demodulating circuit for demodulating said error signal at said one frequency to provide a demodulated error signal, circuit means interconnecting said first control transmitter and said demodulating circuit, a modulating circuit connected to said demodulating circuit for modulating a signal thereof at another frequency by said demodulated error signal to provide a modulated error signal at said other frequency, a servo amplifier responsive to said modulated error signal at said other frequency, a second control transmitter for transmitting synchro data signals at said other frequency, a servomotor interconnecting said amplifier and said first and second control transmitters controlling the operation of said first control transmitter to provide a steady state condition and controlling the operation of said second transmitter for transmitting said synchro data signal at said other frequency.

4. In a single closed loop synchro data converter system, external control transmitters for transmitting fine and coarse control synchro data signals at one frequency, a first fine control transmitter producing a fine control signal and transmitting a fine error signal at said one frequency in response to said fine control signal and said fine controlling signal, a first coarse control transmitter producing a coarse control signal and transmitting a coarse error signal at said one frequency in response to said coarse control signal and said coarse controlling signal, a switching circuit connected to said first control transmitters for switching the output thereof to fine error signals from coarse error signals in response to said fine error signals and said coarse error signals as said error signals approach a null, a demodulating circuit connected to said switching circuit for demodulating said error signals at said one frequency to provide a demodulated error signal, a modulating circuit connecting to said demodulating circuit for modulating a signal thereof at said other frequency by said demodulated error signal to provide a modulated error signal at said other frequency, a second fine control transmitter for transmitting said fine synchro data signal at said other frequency, a second coarse control transmitter for transmitting said coarse synchro data signal at said other frequency, and means including a servomotor mechanically coupled to said first and second control transmitters and responsive to said fine and coarse error signals at said other frequency for controlling the operation of said first control transmitters to provide a steady state condition and controlling the operation of said second control transmitters for transmitting said synchro data signal at said other frequency.

5. In a single closed loop synchro data converter system, means transmitting a synchro data signal at one frequency, means transmitting synchro data at another frequency, a first control transmitter for transmitting an error signal at said one frequency in response to the synchro data at said one frequency, a second control transmitter for transmitting an error signal at said other frequency in response to said synchro data signal at said other frequency, a demodulating circuit for demodulating said error signal at said one frequency to provide a demodulated error signal, means interconnecting said demodulating circuit and said first control transmitter, a modulating circuit for modulating a signal thereof at said other frequency with said demodulated error signal to provide a modulated error signal at said other frequency, first means including a motor for controlling the operation of said first and second control transmitters, and switching means operating at times to connect said modulating circuit to said first means for converting said synchro data at said one frequency to synchro data at said other frequency, and at other times to connect said second control transmitter to said first means for converting said synchro data at said other frequency to synchro data at said one frequency.

6. In a single closed loop synchro data converter system, means transmitting a synchro data signal at one frequency, means transmitting synchro data signal at another frequency, a first control transmitter for transmitting an error signal at said one frequency in response to said synchro data signal at said one frequency, a second control transmitter for transmitting an error signal at said other frequency in response to said synchro data signal at said other frequency, a demodulating circuit for demodulating said error signal at said one frequency to provide a demodulated error signal, means interconnecting said demodulating circuit and said first control transmitter, a modulating circuit connected to said demodulating circuit for modulating a signal at said other frequency with said demodulated error signal to provide a modulated error signal at said other frequency, a servo amplifier for amplifying said error signals at said other frequency, circuit means connecting said second control transmitter to said amplifier, switching means for at times connecting said amplifier to said modulating circuit and at other times connecting said amplifier to said second control transmitter through said circuit means, and a servomotor responsive to said amplifier for at times to convert said synchro data signal at said one frequency to synchro data signal at said other frequency and at other times controlling the operation of said first control transmitter to convert synchro data at said other frequency to synchro data at said one frequency.

7. In a synchro data converter system, means transmitting fine and coarse controlling synchro data signals at one frequency, means transmitting a fine and coarse controlling signal at another frequency, a first fine control transmitter producing a fine controlled signal at said one frequency and transmitting a fine error signal at said one frequency in response to said fine controlled signal at said one frequency and said fine controlling signal at said one frequency, a first coarse control transmitter producing a coarse controlled signal at said one frequency and transmitting a coarse error signal at said one frequency in response to said coarse controlling signal at said one frequency and said coarse controlled signal at said one frequency, a second fine control transmitter producing a fine controlled signal at said other frequency and transmitting a fine error signal at said other frequency in response to said fine controlled signal at said other frequency and fine controlling signal at said other frequency, a second coarse control transmitter producing a coarse controlled signal at said other frequency and transmitting an error signal at said other frequency in response to said coarse controlled signal at said other frequency and said coarse controlling frequency at said other frequency, a first switching circuit connected to said first control transmitters for switching the output thereof to fine error signals at said one frequency from coarse error signals at said one frequency in response to said fine error signal and coarse error signal at said one frequency as said error signals at said one frequency approach a null, a second switching circuit connected to said second transmitters for switching the output thereof to fine error signals at said other frequency from coarse error signals at said other frequency in response to said fine error signals and coarse error signals at said other frequency as said error signals at said other frequency approach a null, a demodulating circuit connected to said first switching circuit for demodulating said error signals at said one frequency to provide a demodulated error signal, a modulating circuit connected to said demodulating circuit for modulating a signal thereof at said other frequency with said demodulated error signal, a first means including a servomotor for controlling the operation of said first and second transmitters, and switching means operating at times to connect said modulating circuit to said first means for converting said synchro data signal of said one frequency into synchro data signal at said other frequency and at other times to connect said second switching circuit to said first means for converting said synchro data signal at said other frequency into synchro data signal at said one frequency.

No references cited.